(12) United States Patent
McClure

(10) Patent No.: US 12,328,634 B1
(45) Date of Patent: Jun. 10, 2025

(54) LOWER-LAYER TRIGGERED MOBILITY FOR RECOVERY FROM RADIO LINK FAILURE

(71) Applicant: AerKodo, LLC, Midlothian, TX (US)

(72) Inventor: Kenneth McClure, Midlothian, TX (US)

(73) Assignee: AerKodo, LLC, Midlothian, TX (US)

( * ) Notice: Subject to any disclaimer, the term of this patent is extended or adjusted under 35 U.S.C. 154(b) by 0 days.

(21) Appl. No.: 19/006,120

(22) Filed: Dec. 30, 2024

Related U.S. Application Data

(60) Provisional application No. 63/734,533, filed on Dec. 16, 2024.

(51) Int. Cl.
  *H04W 36/30* (2009.01)
  *H04L 69/324* (2022.01)

(52) U.S. Cl.
  CPC ......... *H04W 36/305* (2018.08); *H04L 69/324* (2013.01)

(58) Field of Classification Search
  None
  See application file for complete search history.

(56) References Cited

U.S. PATENT DOCUMENTS

| | | | |
|---|---|---|---|
| 2024/0114403 A1* | 4/2024 | Latheef | H04W 36/0061 |
| 2025/0016641 A1* | 1/2025 | Abraham | H04W 36/0055 |
| 2025/0031116 A1* | 1/2025 | Kim | H04W 36/08 |

FOREIGN PATENT DOCUMENTS

WO   WO-2024072796 A1 *   4/2024   ........ H04W 36/0069

OTHER PUBLICATIONS

3GPP TS 38.321 V18.3.0 (Sep. 2024), 335 pages.
3GPP TS 38.331 V18.3.0 (Sep. 2024), 1,694 pages.

* cited by examiner

*Primary Examiner* — Charles N Appiah
*Assistant Examiner* — Frank E Donado

(57) ABSTRACT

A method comprising receiving a first Radio Resource Control (RRC) reconfiguration message, the first RRC reconfiguration message including: a conditional reconfiguration field that comprises a conditional reconfiguration, and a lower-layer triggered mobility (LTM) configuration field that comprises an LTM configuration, the conditional reconfiguration comprising an RRC reconfiguration field that includes a second RRC reconfiguration message, wherein the second RRC reconfiguration message comprises a master key update field and wherein the LTM configuration field is precluded from the second RRC reconfiguration message, the LTM configuration comprising an attempt LTM switch field and an RRC reconfiguration field that includes a third RRC reconfiguration message, wherein the conditional reconfiguration field, the LTM configuration field, and the master key update field are precluded from the third RRC reconfiguration message, detecting a radio link failure of a master cell group (MCG), determining a selected cell based on the radio link failure of the MCG, and performing an LTM cell switch to the selected cell based on the LTM configuration is disclosed.

18 Claims, 5 Drawing Sheets

LOWER-LAYER TRIGGERED MOBILITY FOR RECOVERY FROM RADIO LINK FAILURE

CROSS-REFERENCE TO RELATED APPLICATIONS

The present application claims the benefit of U.S. Provisional Application No. 63/734,533, filed on Dec. 16, 2024, which is incorporated by reference in its entirety.

TECHNICAL FIELD

The present application relates generally to lower-layer triggered mobility for recovery from radio link failure.

BACKGROUND

As wireless communication systems have evolved, numerous methods for handling radio link failure have become possible. However, many of these methods have different and similar capabilities and rely on different and similar configuration information. It may be desirable to provide a solution that is capable of allowing flexible configuration information for various radio link failure recovery methods, while ensuring that the UE performs appropriate actions pertaining to the configuration information. In some circumstances, it may be desirable to provide constraints for the content of configuration information to properly tailor the configuration information to its associated radio link recovery method. In addition, it may be desirable for the UE to select an appropriate radio link recovery method based on the configuration information that it receives.

SUMMARY

Various aspects of examples of the invention are set out in the claims.

One or more embodiments may provide an apparatus, a computer readable medium, a non-transitory computer readable medium, a computer program product, and/or a method for receiving a first Radio Resource Control (RRC) reconfiguration message, the first RRC reconfiguration message including: a conditional reconfiguration field that comprises a conditional reconfiguration and a lower-layer triggered mobility (LTM) configuration field that comprises an LTM configuration, the conditional reconfiguration comprising an RRC reconfiguration field that includes a second RRC reconfiguration message, wherein the second RRC reconfiguration message comprises a master key update field and wherein the LTM configuration field is precluded from the second RRC reconfiguration message, the LTM configuration comprising an attempt LTM switch field and an RRC reconfiguration field that includes a third RRC reconfiguration message, wherein the conditional reconfiguration field, the LTM configuration field, and the master key update field are precluded from the third RRC reconfiguration message, detecting a radio link failure of a master cell group (MCG), determining a selected cell based on the radio link failure of the MCG, and performing an LTM cell switch to the selected cell based on the LTM configuration.

In at least one example embodiment, the conditional reconfiguration comprises an attempt conditional reconfiguration field.

In at least one example embodiment, the conditional reconfiguration field instructs the UE to attempt to apply the second RRC reconfiguration message after radio link failure of the MCG.

In at least one example embodiment, the performing of the LTM cell switch is based on a preference for performing the LTM cell switch over applying the second RRC reconfiguration message.

One or more example embodiments further perform determining that a security update is not required, wherein the performing of the LTM cell switch is based on the determination that the security update is not required.

One or more example embodiments further perform determining that the LTM configuration comprises the attempt LTM switch field, wherein the performing of the LTM cell switch is based on the determination that the LTM configuration comprises the attempt LTM switch field.

One or more embodiments may provide an apparatus, a computer readable medium, a non-transitory computer readable medium, a computer program product, and/or a method for receiving a first Radio Resource Control (RRC) reconfiguration message, the first RRC reconfiguration message including: a conditional reconfiguration field that comprises a conditional reconfiguration, and a lower-layer triggered mobility (LTM) configuration field that comprises an LTM configuration, the conditional reconfiguration comprising an attempt conditional reconfiguration field and an RRC reconfiguration field that includes a second RRC reconfiguration message, wherein the second RRC reconfiguration message comprises a master key update field and wherein the LTM configuration field is precluded from the second RRC reconfiguration message, the LTM configuration comprising an attempt LTM switch field and an RRC reconfiguration field that includes a third RRC reconfiguration message, wherein the conditional reconfiguration field, the LTM configuration field, and the master key update field are precluded from the third RRC reconfiguration message, detecting a radio link failure of a master cell group (MCG), determining a selected cell based on the radio link failure of the MCG, determining whether the LTM configuration comprises the attempt LTM switch field, in circumstance where the LTM configuration comprises the attempt LTM switch field, performing an LTM cell switch to the selected cell based on the LTM configuration, determining whether the conditional reconfiguration comprises the attempt conditional reconfiguration field, and in circumstance where the conditional reconfiguration comprises the attempt conditional reconfiguration field, applying the second RRC reconfiguration message to the selected cell.

In at least one example embodiment, the conditional reconfiguration field instructs the UE to attempt to apply the second RRC reconfiguration message after radio link failure of the MCG.

One or more example embodiments further perform, in circumstances where the LTM configuration comprises the attempt LTM switch field and the conditional reconfiguration comprises the attempt conditional reconfiguration field, performing the LTM cell switch to the selected cell based on the LTM configuration instead of applying the second RRC reconfiguration message to the selected cell.

One or more example embodiments further perform, in circumstances where the LTM configuration comprises the attempt LTM switch field and the conditional reconfiguration comprises the attempt conditional reconfiguration field, further comprising determining whether a security update is required, wherein: the LTM cell switch to the selected cell based on the LTM configuration is performed in circumstances where the security update is not required, and the second RRC reconfiguration message is applied to the selected cell in circumstances where the security update is required.

In at least one example embodiment, the first Radio Resource Control (RRC) reconfiguration message comprises configuration information for the MCG the MCG.

In at least one example embodiment, the conditional reconfiguration field, the LTM configuration field, and the master key update field are precluded from the third RRC reconfiguration message due to the third RRC reconfiguration message being included in the RRC reconfiguration field of the LTM configuration.

In at least one example embodiment, the LTM configuration field is precluded from the second RRC reconfiguration message due to the second RRC reconfiguration message being included in the RRC reconfiguration field of the conditional reconfiguration.

In at least one example embodiment, the second RRC reconfiguration message comprises the conditional reconfiguration field.

In at least one example embodiment, the conditional reconfiguration specifies configuration information for reconfiguring a candidate cell.

In at least one example embodiment, the LTM configuration is configuration information for performing an LTM cell switch.

In at least one example embodiment, the master key update field comprises information pertaining to changing of a master security key.

In at least one example embodiment, the attempt LTM switch field instructs the UE to attempt to perform an LTM cell switch after radio link failure of the MCG.

In at least one example embodiment, the second RRC reconfiguration message comprises a data radio bearer (DRB) configuration comprising a dual active protocol stack (DAPS) configuration field.

In at least one example embodiment, the DAPS configuration field indicates that a DRB configured by the DRB configuration is a DAPS bearer.

In at least one example embodiment, the DAPS configuration field is precluded from the third RRC Reconfiguration message.

In at least one example embodiment, the DAPS configuration field is precluded from the third RRC reconfiguration message due to the third RRC reconfiguration message being included in the RRC reconfiguration field of the LTM configuration.

In at least one example embodiment, the second RRC reconfiguration message comprises a radio link control (RLC) bearer configuration comprising a reestablish RLC field.

In at least one example embodiment, the reestablish RLC field instructs the UE to reestablish RLC when applying the RLC bearer configuration.

In at least one example embodiment, the reestablish RLC field is precluded from the third RRC reconfiguration message.

In at least one example embodiment, the reestablish RLC field is precluded from the third RRC reconfiguration message due to the third RRC reconfiguration message being included in the RRC reconfiguration field of the LTM configuration.

One or more example embodiments further perform determining that the selected cell is associated with the LTM configuration, wherein the performing of the LTM cell switch is based on the determination that the selected cell is associated with the LTM configuration.

In at least one example embodiment, determining that the selected cell is associated with the LTM configuration comprises determining that the selected cell is an LTM candidate cell corresponding to an LTM candidate field included in the LTM configuration.

One or more example embodiments further perform determining that the selected cell is associated with the conditional reconfiguration, wherein applying of the second RRC reconfiguration message to the selected cell is based on the determination that the selected cell is associated with the conditional configuration.

In at least one example embodiment, determining that the selected cell is associated with the conditional configuration comprises determining that the selected cell is a candidate cell corresponding to a candidate cell indicated in the conditional configuration.

In at least one example embodiment, the second RRC reconfiguration message includes a multiple radio access technology dual connectivity (MRDC) secondary cell group configuration field that indicates configuration of a MRDC secondary cell group, and an MRDC secondary cell group configuration field indicating configuration of a MRDC secondary cell group is precluded from the third RRC reconfiguration message.

In at least one example embodiment, the third RRC reconfiguration message comprises the MRDC secondary cell group configuration field indicating release.

In at least one example embodiment, the MRDC secondary cell group configuration field indicating configuration of a MRDC secondary cell group is precluded from the third RRC reconfiguration message due to the third RRC reconfiguration message being included in the RRC reconfiguration field of the LTM configuration.

In at least one example embodiment, performing the LTM cell switch comprises releasing a plurality of dedicated RRC configurations and a plurality of common RRC configurations.

In at least one example embodiment, performing the LTM cell switch comprises retaining a radio bearer configuration.

In at least one example embodiment, performing the LTM cell switch comprises retaining a radio link control (RLC) bearer configuration.

In at least one example embodiment, retaining the RLC bearer configuration comprises retaining a logical channel identity of an RLC bearer configured by the RLC bearer configuration.

BRIEF DESCRIPTION OF THE DRAWINGS

For a more complete understanding of embodiments of the invention, reference is now made to the following descriptions taken in connection with the accompanying drawings in which.

DETAILED DESCRIPTION

Figure 1:
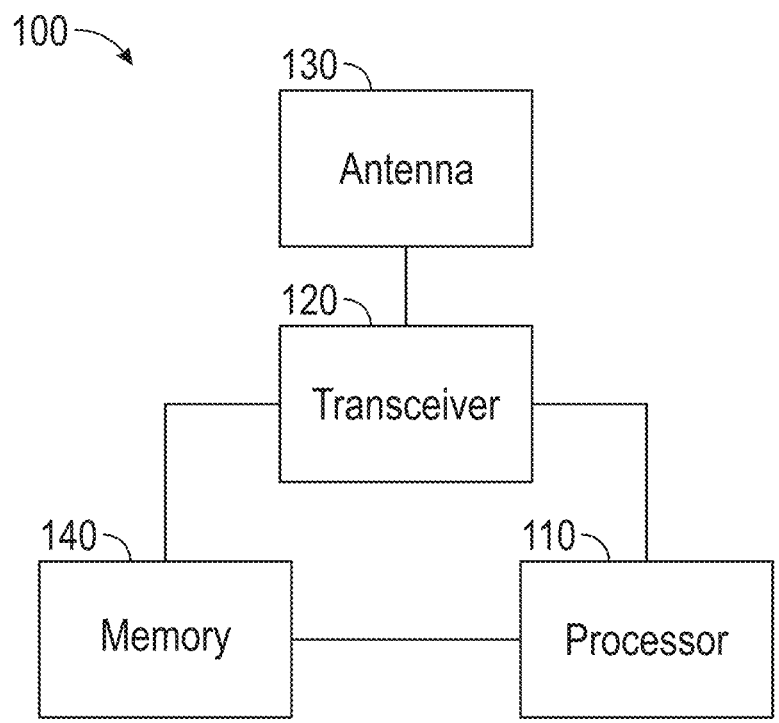
FIG. 1 is a block diagram illustrating an apparatus according to at least one example embodiment.

An embodiment of the invention and its potential advantages are understood by referring to FIGS. 1 through 8 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 100, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 100 is illustrated and will be hereinafter described for purposes of example, other types of electronic apparatuses may readily employ embodiments of the invention. Electronic apparatus 100 may be a network node, such as a user equipment (UE) or a base station, and/or may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 100 comprises processor 110 and memory 140. Processor 110 may be any type of processor, controller, embedded controller, processor core, and/or the like. In at least one example embodiment, processor 110 utilizes computer program code to cause an apparatus to perform one or more actions. Memory 140 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 140 may store any of a number of pieces of information, and data. The information and data may be used by electronic apparatus 100 to implement one or more functions of the electronic apparatus 100, such as the functions described herein. In at least one example embodiment, memory 140 includes computer program code such that the memory and the computer program code are configured to, working with the processor, cause the apparatus to perform one or more actions described herein.

The electronic apparatus 100 may further comprise a transceiver 120. In at least one example embodiment, transceiver 120 is coupled with one or more antennae 130. In at least one example embodiment, processor 110 provides and or receives signals to/from transceiver 120. The signals may comprise signaling information in accordance with a communications interface standard, user speech, received data, user generated data, and/or the like. Transceiver 120 may operate with one or more air interface standards, communication protocols, modulation types, and access types. By way of illustration, the electronic transceiver 120 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD- SCDMA), and/or with fourth-generation (4G) wireless communication protocols such as LTE, fifth-generation (5G) protocols such as New Radio (NR) wireless networking protocols, such as 802.11, short-range wireless protocols, such as Bluetooth, and/or the like.

Processor 110 may comprise means, such as circuitry, for implementing audio, video, communication, navigation, logic functions, and/or the like, as well as for implementing embodiments of the invention including, for example, one or more of the functions described herein. For example, processor 110 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 100 among these devices according to their respective capabilities. The processor 110 thus may comprise the functionality to encode and interleave message and data prior to modulation and transmission. Processor 1 may additionally comprise an internal voice coder and may comprise an internal data modem. Further, the processor 110 may comprise functionality to operate one or more software programs, which may be stored in memory, and which may, among other things, cause the processor 110 to implement at least a portion of one embodiment including, for example, one or more of the functions described herein. For example, the processor 110 may operate a connectivity program, such as a conventional internet browser. The connectivity program may allow the electronic apparatus 100 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 100 may comprise a user interface for providing output and/or receiving input. The electronic apparatus 100 may comprise an output device, which may comprise an audio output device, such as a ringer, an earphone, a speaker, a tactile output device, such as a vibration transducer, an electronically deformable surface, an electronically deformable structure, a visual output device, such as a display and/or a light. The electronic apparatus may comprise an input device such as a light sensor, a proximity sensor, a microphone, a touch sensor, a force sensor, a button, a keypad, a motion sensor, a magnetic field sensor, a camera, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

Figure 2:
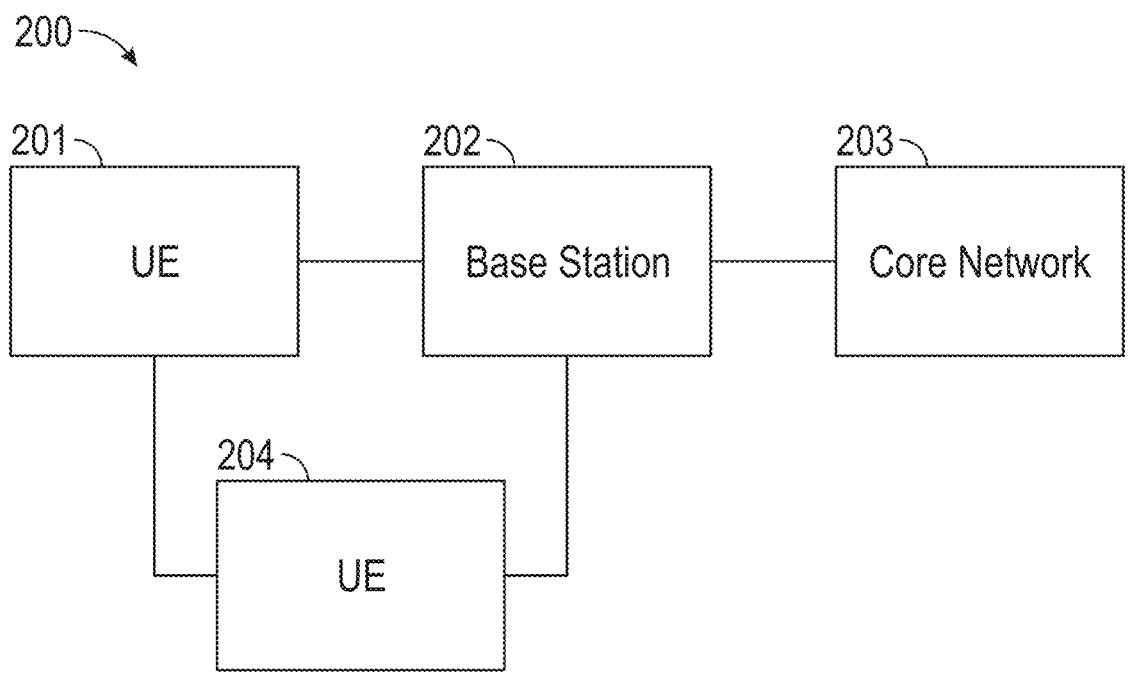
FIG. 2 is a block diagram illustrating a wireless communications system, according to at least one example embodiment.

FIG. 2 illustrates an example of a wireless communications system 200, according to at least one example embodiment. The wireless communications system 200 includes one or more base stations 202, a core network 203, and one or more user equipment (UE), such as UE 201 and/or UE 204. In some examples, the wireless communications system 200 may be a Long Term Evolution (LTE), LTE-Advanced (LTE-A) network, a New Radio (NR) network, etc. In some circumstances, wireless communications system 200 may support enhanced broadband communications, ultra-reliable (i.e., mission critical) communications, low latency communications, and communications with low-cost and low-complexity devices. To improve the reliability of some communications (e.g., ultra-reliable low latency communications (URLLC) packets), the wireless communications system 200 may be configured to generate and transmit duplicate packets. In such duplication systems, a transmitting device (e.g., base station 202, UE 201, or UE 204) may duplicate a packet. The original packet and duplicated packets may be transmitted to a receiving device (e.g., base station 202, UE 201, or UE 204). Transmitting multiple packets that include the same information may improve the likelihood that the receiving device receives the information included in the multiple packets.

One or more base stations 202 may wirelessly communicate with one or more UEs (e.g. UE 201 or UE 204) via one or more base station antennas. Each base station 202 may provide communication coverage for a respective geographic coverage area. Communication links in wireless communications system 200 may include uplink transmissions from a UE to a base station 202, or downlink transmissions, from a base station 202 to a UE. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

A plurality of UEs may be dispersed throughout the wireless communications system 200, and each UE may be stationary or mobile. A UE may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some circumstances, a UE may also be able to communicate directly with other UEs using sidelink communication (e.g., using a peer-to-peer (P2P) or device-to-device (D2D) protocol). For example, FIG. 2 provides an example of such communication between UE 201 and UE 204. One or more of a group of UEs utilizing sidelink communications may be within the coverage area of a cell. Other UEs in such a group may be outside the coverage area of a cell, or otherwise unable to receive transmissions from base station 202. In some circumstances, groups of UEs communicating via sidelink communications may utilize a one-to-many (1: M) system in which each UE transmits to every other UE in the group. In some circumstances, base station 202 facilitates the scheduling of resources for sidelink communications. In other circumstances, sidelink communications are carried out independent of base station 202.

In some circumstances, UE 204 may operate as a relay UE for UE 201. For example, instead of UE communicating directly with base station 202, UE 204 may be configured to operate as a relay such that UE 201 communicates to base station 202 via communication directly through UE 204. For example, UE 204 may operate as a Layer 2 (L2) UE to Network (U2N) relay.

Some UEs, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some circumstances, an MTC device may operate using half-duplex (one-way) communications at a reduced peak rate. MTC devices may also be configured to enter a power saving "deep sleep" mode when not engaging in active communications. In some circumstances, MTC or IoT devices may be designed to support mission critical functions and wireless communication systems may be configured to provide ultra-reliable communications for these functions.

Base station 202 may communicate with the core network 203 and with one or more other base stations. For example, base stations may interface with the core network 203 through come backhaul links (e.g., S1, etc.). Base stations may communicate with one another over other backhaul links (e.g., X2, etc.) either directly or indirectly (e.g., through core network 203). Base stations may perform radio configuration and scheduling for communication with UEs or may operate under the control of a base station controller (not shown). In some examples, base station 202 may be a macro cell, a small cell, a hot spot, and/or the like. Base stations may also be referred to as evolved NodeBs (NBs), such as eNBs, gNBs and/or the like.

Base station 202 may be connected by an S1 interface to core network 203. The core network may be an evolved packet core (EPC), which may include at least one mobility management entity (MME), at least one serving gateway (S-GW), and at least one Packet Data Network (PDN) gateway (P-GW). The MME may be the control node that processes the signaling between UE 201 and the EPC. All user Internet Protocol (IP) packets may be transferred through the S-GW, which itself may be connected to the P-GW. The P-GW may provide IP address allocation as well as other functions. The P-GW may be connected to the network operators IP services. The operator's IP services may include the Internet, the Intranet, an IP Multimedia Subsystem (IMS), and a Packet-Switched (PS) Streaming Service.

The core network 203 may provide user authentication, access authorization, tracking, IP connectivity, and other access, routing, or mobility functions. At least some of the network devices, such as base station 202 may include subcomponents such as an access network entity, which may be an example of an access node controller (ANC). Each access network entity may communicate with a number of UEs through a number of other access network transmission entities, each of which may be an example of a smart radio head, or a transmission/reception point (TRP). In some configurations, various functions of each access network entity or base station may be distributed across various network devices (e.g., radio heads and access network controllers) or consolidated into a single network device (e.g., base station 202).

Wireless communications system 200 may operate in an ultra-high frequency (UHF) frequency region using frequency bands from 700 MHz to 2600 MHZ (2.6 GHZ), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight and may be blocked by buildings and environmental features. However, the waves may penetrate walls sufficiently to provide service to UEs located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some circumstances, wireless communications system 200 may also utilize extremely high frequency (EHF) portions of the spectrum (e.g., from 30 GHz to 300 GHZ). This region may also be known as the millimeter band, since the wavelengths range from approximately one millimeter to one centimeter in length. Thus, EHF antennas may be even smaller and more closely spaced than UHF antennas. In some circumstances, this may facilitate the use of antenna arrays within UE 201 (e.g., for directional beamforming). However, EHF transmissions may be subject to even greater atmospheric attenuation and shorter range than UHF transmissions.

Thus, wireless communications system 200 may support millimeter wave (mmW) communications between UEs and base stations. Devices operating in mmW or EHF bands may have multiple antennas to allow beamforming. That is, base station 202 may use multiple antennas or antenna arrays to conduct beamforming operations for directional communications with UE 201. Beamforming (which may also be referred to as spatial filtering or directional transmission) is a signal processing technique that may be used at a transmitter (e.g., a base station) to shape and/or steer an overall antenna beam in the direction of a target receiver (e.g., a UE). This may be achieved by combining elements in an antenna array in such a way that transmitted signals at particular angles experience constructive interference while others experience destructive interference.

A cell can operate within a total channel bandwidth. In some circumstances, it may be desirable for the cell to have a construct that refers to a distinct portion of the total channel bandwidth, such as a bandwidth part (BWP). Such a structure allows for configuration information for the cell to be common within a BWP, and different across different BWPs. For example, it may be desirable for the cell to have 2 BWPs so that time-frequency resources are configured differently between the two BWPs. In addition, such a construct allows for a smooth transition between a configuration for a BWP and a configuration for a different BWP by merely indexing the correct BWP and referencing the configuration information for the indexed BWP. In this manner, each BWP may have its own configuration information for governing multiple aspects of communication, such as physical layer resources, MAC resources, RRC resources, etc.

Multiple-input multiple-output (MIMO) wireless systems use a transmission scheme between a transmitter (e.g., a base station) and a receiver (e.g., a UE), where both transmitter and receiver are equipped with multiple antennas. Some portions of wireless communications system 200 may use beamforming. For example, base station 202 may have an antenna array with a number of rows and columns of antenna ports that the base station may use for beamforming in its communication with UE 201. Signals may be transmitted multiple times in different directions (e.g., each transmission may be beamformed differently). A mmW receiver (e.g., a UE) may try multiple beams (e.g., antenna subarrays) while receiving the synchronization signals.

In some circumstances, the antennas of base station 202 or UE 201 may be located within one or more antenna arrays, which may support beamforming or MIMO operation. One or more base station antennas or antenna arrays may be collocated at an antenna assembly, such as an antenna tower. In some circumstances, antennas or antenna arrays associated with base station 202 may be located in diverse geographic locations. Base station 202 may use multiple antennas or antenna arrays to conduct beamforming operations for directional communications with UE 201.

In some circumstances, wireless communications system 200 may be a packet-based network that operates according to a layered protocol stack. In the user plane, communications at the bearer or PDCP layer may be IP-based. An RLC layer may in some circumstances perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between UE 201 and a network device or core network 203 supporting radio bearers for user plane data. At the Physical (PHY) layer, transport channels may be mapped to physical channels.

Time intervals in LTE or NR may be expressed in multiples of a basic time unit (which may be a sampling period of Ts=1/30,720,000 seconds). Time resources may be organized according to radio frames of length of 10 ms (Tf=307200 Ts), which may be identified by a system frame number (SFN) ranging from 0 to 1023. Each frame may include ten one ms subframes numbered from zero to nine. A subframe may be further divided into two 0.5 ms slots, each of which contains six or seven modulation symbol periods (depending on the length of the cyclic prefix prepended to each symbol). Excluding the cyclic prefix, each symbol contains 2048 sample periods. In some circumstances, the subframe may be the smallest scheduling unit, also known as a TTI. In other circumstances, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain twelve consecutive subcarriers in the frequency domain and, for a normal cyclic prefix in each orthogonal frequency-division multiplexing (OFDM) symbol, seven consecutive OFDM symbols in the time domain (one slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 200 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. UE 201 may be configured with multiple downlink CCs and one or more uplink CCs for carrier aggregation. Carrier aggregation may be used with both frequency division duplexing (FDD) and time division duplexing (TDD) component carriers.

In some circumstances, wireless system 200 may utilize both licensed and unlicensed radio frequency spectrum bands. For example, wireless system 200 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base station 202 and UE 201 may employ listen-before-talk (LBT) procedures to ensure the channel is clear before transmitting data. In some circumstances, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Figure 3:
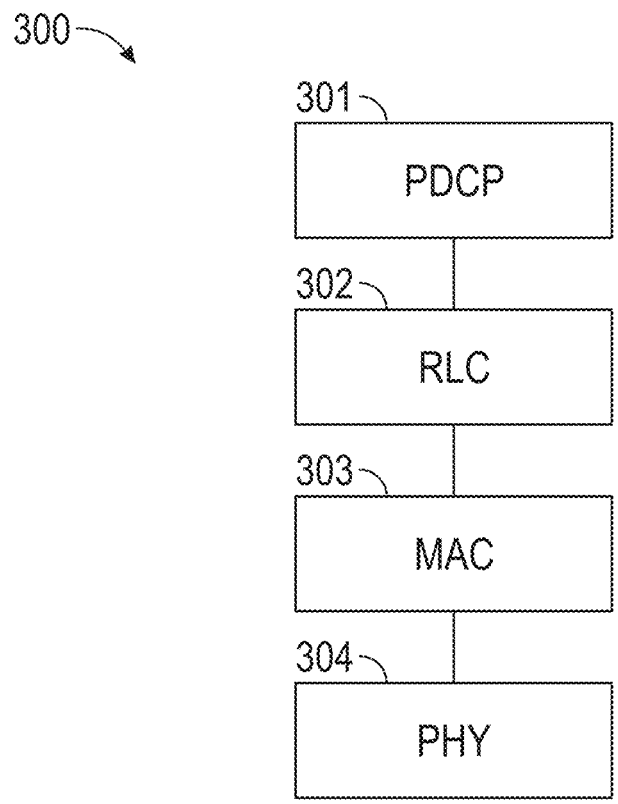
FIG. 3 is a diagram illustrating a protocol stack according to at least one example embodiment.

FIG. 3 is a diagram illustrating a protocol stack 300 according to at least one example embodiment. The example of FIG. 3 is merely an example and does not necessarily limit the scope of the claims.

In at least one example embodiment, physical (PHY) layer 304 provides an information transfer service to a higher layer using a physical channel. The PHY layer 304 may be connected to a medium access control (MAC) layer 303 located on the higher layer via a transport channel. Data may be transported between the MAC layer 303 and the PHY layer 304 via the transport channel. Data may be transported between a physical layer of a transmitting side and a physical layer of a receiving side via physical channels. The physical channels use time and frequency as radio resources. In some circumstances, the physical channel is modulated using an orthogonal frequency division multiple access (OFDMA) scheme in downlink and is modulated using a single carrier frequency division multiple access (SC-FDMA) scheme in uplink.

In at least one example embodiment, MAC layer 303 provides a service to a radio link control (RLC) layer 302 of a higher layer via a logical channel. The RLC layer 302 of the second layer supports reliable data transmission. A function of the RLC layer 302 may be implemented by a functional block of the MAC layer 303. A packet data convergence protocol (PDCP) layer 301 performs a header compression function to reduce unnecessary control information for efficient transmission of an Internet protocol (IP)

packet such as an IP version 4 (IPv4) packet or an IP version 6 (IPv6) packet in a radio interface having a relatively small bandwidth.

In at least one example embodiment, the PDCP layer 301 is implemented by way of a PDCP entity that performs various actions of the PDCP layer. In this manner, an operating network node comprises one or more PDCP entities for performing PDCP layer activities. In operation, the PDCP entity receives data for transmission from higher layers in a PDCP service data unit (SDU). The PDCP entity performs various operations on the PDCP SDUs that it receives from higher layers for transmission, such as header compression, uplink data compression, integrity protection, ciphering, and/or the like. The PDCP entity performs these operations on a received PDCP SDU to generate a PDCP packet data unit (PDU) that is transmitted by way of the PDCP entity sending the PDCP SDU to lower layers for transmission.

In at least one example embodiment, the RLC layer 302 is implemented by way of a RLC entity that performs various actions of the RLC layer. In this manner, an operating network node comprises one or more RLC entities for performing RLC layer activities. In operation, the RLC entity receives data for transmission from higher layers in a RLC SDU. The RLC entity performs various operations on the RLC SDUs that it receives from higher layers for transmission, such as header compression, uplink data compression, integrity protection, ciphering, and/or the like. The RLC entity performs these operations on a received RLC SDU to generate a RLC PDU that is transmitted by way of the RLC entity sending the RLC SDU to lower layers for transmission.

In at least one example embodiment, the MAC layer 303 is implemented by way of a MAC entity that performs various actions of the MAC layer. In this manner, an operating network node comprises one or more MAC entities for performing MAC layer activities. In operation, the MAC entity receives data for transmission from higher layers in a MAC SDU. The MAC entity performs various operations on the MAC SDUs that it receives from higher layers for transmission, such as header compression, uplink data compression, integrity protection, ciphering, and/or the like. The MAC entity performs these operations on a received MAC SDU to generate a MAC PDU that is transmitted by way of the MAC entity sending the MAC SDU to lower layers for transmission.

In some circumstances, it may be desirable for the base station to provide configuration parameters to the UE. For example, it may be desirable for the UE to receive configuration parameters that allow the UE to configure multiple layers, such as the layers discussed with respect to FIG. 3. In such circumstances, the UE receives an RRC reconfiguration message from the base station and applies the RRC reconfiguration message to set various parameters for multiple layers in conformance with the configuration information included in the RRC reconfiguration message. In at least one example embodiment, the RRC reconfiguration message is an RRCReconfiguration message.

Figure 4:
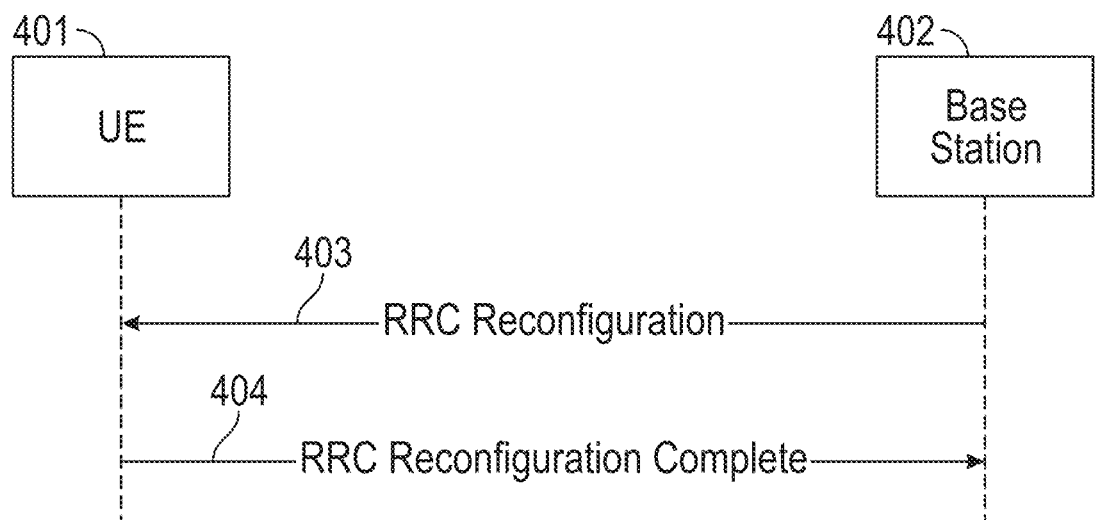
FIG. 4 is an interaction diagram illustrating activities associated with RRC reconfiguration according to at least one example embodiment.

FIG. 4 is an interaction diagram illustrating activities associated with radio resource control (RRC) reconfiguration according to at least one example embodiment. In at least one example embodiment, there is a set of operations that corresponds with the activities of FIG. 4. An apparatus, for example electronic apparatus 100 of FIG. 1, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform the set of operations of FIG. 4. UE 401 may be UE 201 or UE 204 of FIG. 2 and base station 402 may be base station 202 of FIG. 2.

In at least one example embodiment, UE 401 receives RRC reconfiguration message 403 from base station 402. In at least one example embodiment, upon receiving the RRC reconfiguration message, the UE applies the RRC reconfiguration message by releasing various configurations and applying the configurations included in the RRC reconfiguration message. Upon applying the RRC reconfiguration message, UE 401 sends RRC reconfiguration complete message 404 to base station 402.

In at least one example embodiment, the received RRC reconfiguration message comprises configuration information for a master cell group (MCG). For example, the UE may apply the RRC configuration message to become configured to communicate with the MCG.

In at least one example embodiment, the RRC reconfiguration message includes different types of configuration information. For example, the RRC reconfiguration message may include dedicated RRC configurations, such as dedicated bandwidth part (BWP) configuration information (such as a bwp-Dedicated information element), dedicated random access channel (RACH) configuration information (such as RACH-ConfigDedicated), and/or the like. In another example, the RRC reconfiguration message may include common RRC configurations, such as common BWP configuration information (such as a bwp-Common information element), common RACH configuration information (such as RACH-ConfigCommon), common serving cell configuration information (such as ServingCellConfigCommon), and/or the like.

In some circumstances, the RRC reconfiguration message includes security configuration information. In at least one example embodiment, the RRC reconfiguration message comprises a master key update field. In at least one example embodiment, the master key update field comprises information pertaining to changing of a master security key. For example, the master key update field may comprise a change indicator for a key set, a hop chaining indication, and/or the like.

In some circumstances, the RRC reconfiguration message includes bearer configuration information. In at least one example embodiment, the RRC reconfiguration message comprises data radio bearer (DRB) configuration information. In at least one example embodiment, the DRB configuration information is included in a radio bearer configuration field that is embedded within the RRC reconfiguration message.

In some circumstances, the RRC reconfiguration message includes configuration information pertaining to dual active protocol stack (DAPS) operation. In at least one example embodiment, the RRC reconfiguration message comprises a DAPS configuration field. In at least one example embodiment, the DAPS configuration field is included in a data radio bearer (DRB) configuration embedded within the RRC reconfiguration message. In at least one example embodiment, the DAPS configuration field indicates that a DRB configured by the DRB configuration is a DAPS bearer. In at least one example embodiment, the presence of the DAPS configuration field in the DRB configuration indicates that the associated DRB is a DAPS bearer.

In some circumstances, the RRC reconfiguration message includes radio link control (RLC) configuration information. In at least one example embodiment, the RRC reconfiguration message comprises an RLC bearer configuration. In at least one example embodiment, the RLC bearer configuration is embedded within the RRC reconfiguration message and is used for configuring the RLC entity. In at least one example embodiment, the RLC bearer configuration comprises a reestablish RLC field. In at least one example embodiment, the reestablish RLC field is a directive for the UE to reestablish the RLC entity when resuming an RRC connection. In at least one example embodiment, the presence of the reestablish RLC field in the RLC bearer configuration indicates that the associated RLC entity must be reestablished when resuming an RRC connection. In at least one example embodiment, the RLC bearer configuration includes a logical channel identity to indicate a logical channel associated with the RLC bearer configured by the RLC bearer configuration.

In some circumstances, the RRC reconfiguration message includes multiple radio access technology dual connectivity (MRDC) configuration information. In at least one example embodiment, the RRC reconfiguration message comprises a MRDC secondary cell group configuration field. In at least one example embodiment, the MRDC secondary cell group configuration field indicates either configuration or release of a MRDC secondary cell group.

Even though the above example illustrates the UE applying the RRC reconfiguration message in response to receiving the RRC reconfiguration message, it may be desirable to apply a previously received RRC reconfiguration message in some circumstances. For example, it may be desirable to apply a previously received RRC reconfiguration message when a radio link failure is detected. For example, when an RRC reconfiguration message is received to configure an MCG, it may be desirable for the RRC reconfiguration message to include an embedded RRC reconfiguration message that can be applied when radio link failure of the MCG is detected.

In at least one example embodiment, when a radio link failure is detected, the UE selects a cell for recovery. Upon selecting the cell, the UE can use configuration information that was included in the RRC reconfiguration message that configured the MCG of the failed radio link. Therefore, in such circumstances, it may be desirable for the RRC reconfiguration message to include configuration information for facilitating such recovery.

In at least one example embodiment, conditional reconfiguration refers to a process where the UE applies a conditional RRC reconfiguration message to a selected cell for radio link failure recovery. In such an example, the conditional RRC reconfiguration message may be included in the RRC reconfiguration message that configured the MCG of the failed radio link. For example, the conditional RRC reconfiguration message may include configuration information for a particular cell that enables the UE to configure each of the layers of the protocol stack for communication with the particular cell, without needing to receive an RRC reconfiguration message after the radio link failure. In this manner, the conditional RRC reconfiguration allows the UE to recover from the radio link failure without the delay associated with receiving an RRC reconfiguration message after the radio link failure.

In at least one example embodiment, the received RRC reconfiguration message includes a conditional reconfiguration field that comprises a conditional reconfiguration. In at least one example embodiment, the conditional reconfiguration is an information element that is used for configuring the parameters of a conditional reconfiguration operation. In such an example, the conditional reconfiguration specifies configuration information for reconfiguring a candidate cell, such as a selected cell. In at least one example embodiment, the conditional reconfiguration comprises an RRC reconfiguration field that includes a second RRC reconfiguration message. For ease of discussion, the RRC reconfiguration message that is included in the conditional reconfiguration (which is included in the received RRC reconfiguration) is referred to as the second RRC reconfiguration message. The term "second" is used merely to differentiate the RRC reconfiguration message that is included in the conditional reconfiguration from other RRC reconfiguration messages and does indicate any significance beyond mere differentiation. For example, the term "second" does not denote rank, priority order, etc.

In at least one example embodiment, the conditional reconfiguration comprises an attempt conditional reconfiguration field. In at least one example embodiment, the attempt conditional reconfiguration field is an indicator that the conditional reconfiguration can be used for performing conditional reconfiguration after radio link failure. In at least one example embodiment, the conditional reconfiguration field instructs the UE to attempt to apply the second RRC reconfiguration message after radio link failure of the MCG. In at least one example embodiment, presence of the attempt conditional reconfiguration field in the conditional reconfiguration instructs the UE to attempt to apply the second RRC reconfiguration message after radio link failure of the MCG.

In at least one example embodiment, lower-layer triggered mobility (LTM) refers to a process where a UE can change cells by reconfiguring lower layers while retaining configuration of higher layers. For example, when performing an LTM cell switch, the UE can retain at least a part of its RLC configuration. This allows for much less delay in reconfiguration and much less processing and signaling overhead.

The LTM cell switch can be characterized as a process where some configuration information is retained and some configuration information is released. In at least one example embodiment, performing the LTM cell switch comprises releasing a plurality of dedicated RRC configurations and a plurality of common RRC configurations. In at least one example embodiment, performing the LTM cell switch comprises retaining a radio bearer configuration. In at least one example embodiment, performing the LTM cell switch comprises retaining a cell radio network temporary identifier (C-RNTI) of the MCG. In at least one example embodiment, performing the LTM cell switch comprises retaining a security configuration associated with a master key.

In at least one example embodiment, the LTM cell switch comprises retaining a radio link control (RLC) bearer configuration. In at least one example embodiment, retaining the RLC bearer configuration comprises retaining a logical channel identity of an RLC bearer configured by the RLC bearer configuration. In at least one example embodiment, retaining the RLC bearer configuration comprises retaining state variables of an RLC bearer configured by the RLC bearer configuration. In at least one example embodiment, retaining the RLC bearer configuration comprises retaining an associated RLC entity of an RLC bearer configured by the RLC bearer configuration. In at least one example embodiment, retaining the RLC bearer configuration comprises retaining timers of an RLC bearer configured by the RLC bearer configuration. In at least one example embodiment, retaining the RLC bearer configuration comprises retaining buffers of an RLC bearer configured by the RLC bearer configuration. In at least one example embodiment, retaining the RLC bearer configuration comprises resetting a transmission count of an RLC bearer configured by the RLC bearer configuration.

In some circumstances, it may be desirable to perform an LTM cell switch to recover from a radio link failure. In such circumstances, it may be desirable for the received RRC reconfiguration to include an LTM configuration that provides configuration information that allows the UE to perform an LTM cell switch when a radio link failure is detected.

In at least one example embodiment, the received RRC reconfiguration message includes a lower-layer triggered mobility (LTM) configuration field that comprises an LTM configuration. In at least one example embodiment, the LTM configuration is configuration information for performing an LTM cell switch. In at least one example embodiment, the LTM configuration comprises an RRC reconfiguration field that includes a third RRC reconfiguration message. In at least one example embodiment, performing the LTM cell switch comprises applying the third RRC Reconfiguration message. For case of discussion, the RRC reconfiguration message that is included in the LTM configuration (which is included in the received RRC reconfiguration) is referred to as the third RRC reconfiguration message. The term "third" is used merely to differentiate the RRC reconfiguration message that is included in the LTM configuration from other RRC reconfiguration messages and does indicate any significance beyond mere differentiation. For example, the term "third" does not denote rank, priority order, etc.

In at least one example embodiment, the LTM configuration comprises an attempt LTM switch field. In at least one example embodiment, the attempt LTM switch field is an indicator that the LTM configuration can be used for performing an LTM cell switch after radio link failure. In at least one example embodiment, the attempt LTM switch field instructs the UE to attempt to perform an LTM cell switch after radio link failure of the MCG. In at least one example embodiment, presence of the attempt LTM switch field in the LTM configuration instructs the UE to attempt to perform an LTM cell switch after radio link failure of the MCG.

As previously discussed, the RRC reconfiguration message can be used for multiple purposes. For example, the RRC reconfiguration message can be used for configuring a current cell, can be used for configuring a conditional reconfiguration to be used for recovering from a radio link failure, and can be used for configuring an LTM cell switch to be used for recovering from a radio link failure. However, each of these purposes are associated with different constraints. For example, some configurations that are possible for the RRC reconfiguration message may be incompatible, irrelevant, or undesirable for a particular purpose. Therefore, in some circumstances it may be desirable to place constraints on the configurations that are allowed for RRC reconfiguration messages that are used for particular purposes. Such constraints can improve overall system efficiency and prevent undesirable operations from being performed due to unconstrained configurations that are inapplicable to the particular purpose of the RRC reconfiguration.

In at least one example embodiment, various fields are precluded from the second RRC reconfiguration message (i.e. the RRC reconfiguration message that is included in the RRC reconfiguration field that is included in the conditional reconfiguration). In at least one example embodiment, the term "precluded" relates to a particular field being unavailable for inclusion. It may be desirable to preclude fields from the second RRC reconfiguration message that are not applicable to the conditional reselection.

In at least one example embodiment, the LTM configuration field is precluded from the second RRC reconfiguration message. In at least one example embodiment, the LTM configuration field is precluded from the second RRC reconfiguration message due to the second RRC reconfiguration message being included in the RRC reconfiguration field of the conditional reconfiguration.

In at least one example embodiment, various fields are precluded from the third RRC reconfiguration message (i.e. the RRC reconfiguration message that is included in the RRC reconfiguration field that is included in the LTM configuration). It may be desirable to preclude fields from the third RRC reconfiguration message that are not applicable to the LTM cell switch.

In at least one example embodiment, the conditional reconfiguration field is precluded from the third RRC reconfiguration message. In at least one example embodiment, the conditional reconfiguration field is precluded from the third RRC reconfiguration message due to the third RRC reconfiguration message being included in the RRC reconfiguration field of the LTM configuration. In at least one example embodiment, the LTM configuration field is precluded from the third RRC reconfiguration message. In at least one example embodiment, the LTM configuration field is precluded from the third RRC reconfiguration message due to the third RRC reconfiguration message being included in the RRC reconfiguration field of the LTM configuration. In at least one example embodiment, the master key update field is precluded from the third RRC reconfiguration message. In at least one example embodiment, the master key update field is precluded from the third RRC reconfiguration message due to the third RRC reconfiguration message being included in the RRC reconfiguration field of the LTM configuration. In at least one example embodiment, the DAPS configuration field is precluded from the third RRC Reconfiguration message. In at least one example embodiment, the DAPS configuration field is precluded from the third RRC reconfiguration message due to the third RRC reconfiguration message being included in the RRC reconfiguration field of the LTM configuration. In at least one example embodiment, the reestablish RLC field is precluded from the third RRC Reconfiguration message. In at least one example embodiment, the reestablish RLC field is precluded from the third RRC reconfiguration message due to the third RRC reconfiguration message being included in the RRC reconfiguration field of the LTM configuration.

In some circumstances, it may be desirable to ensure that the third RRC reconfiguration message does not comprise an MRDC secondary cell group configuration field that indicates any configuration of a MRDC secondary cell group. However, in such circumstances, it may be desirable to allow the third RRC reconfiguration message to comprise an MRDC secondary cell group configuration field indicating a value of release. In at least one example embodiment, the third RRC reconfiguration message comprises the MRDC secondary cell group configuration field indicating release. In at least one example embodiment, the MRDC secondary cell group configuration field indicating configuration of a MRDC secondary cell group is precluded from the third RRC reconfiguration message. In at least one example embodiment, the MRDC secondary cell group configuration field indicating configuration of a MRDC secondary cell group is precluded from the third RRC reconfiguration message due to the third RRC reconfiguration message being included in the RRC reconfiguration field of the LTM configuration.

Figure 5:
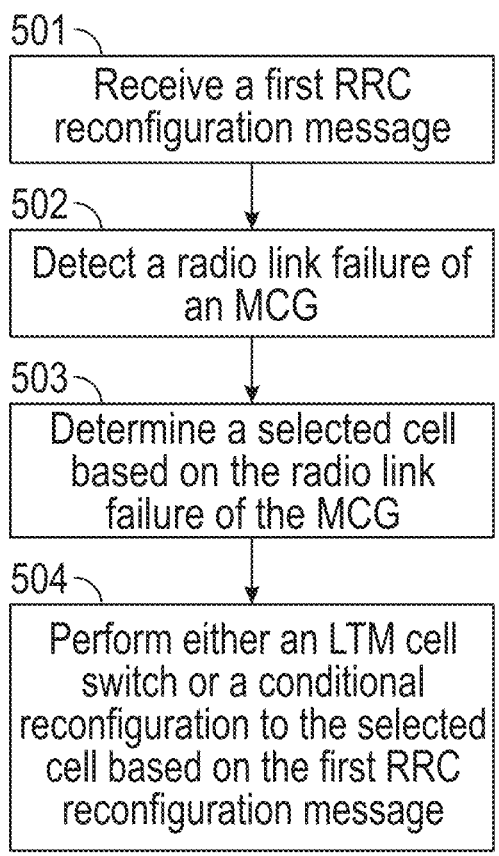
FIG. 5 is a flow diagram illustrating activities associated with transitioning to a selected cell according to at least one example embodiment.

FIG. 5 is a flow diagram illustrating activities associated with transitioning to a selected cell according to at least one example embodiment. In at least one example embodiment, there is a set of operations that corresponds with, at least some of, the activities of FIG. 5. For example, there may be a set of operations associated with activities of one or more apparatuses of FIG. 5. An apparatus, for example electronic apparatus 100 of FIG. 1, or a portion thereof, UE 201 of FIG. 2, or a portion thereof, or UE 204 of FIG. 2, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform set of operations of FIG. 5.

At block 501, the apparatus receives a first Radio Resource Control (RRC) reconfiguration message. In at least one example embodiment, the first RRC reconfiguration message configures a master cell group (MCG).

At block 502, the apparatus detects a radio link failure of an MCG. In at least one example embodiment, the MCG is the MCG configured by the first RRC reconfiguration message.

At block 503, the apparatus determines a selected cell based on the radio link failure of the MCG. In at least one example embodiment, the apparatus determines a selected cell in response to the radio link failure of the MCG.

At block 504, the apparatus performs either an LTM cell switch or a conditional reconfiguration to the selected cell based on the first RRC reconfiguration message.

In at least one example embodiment, the apparatus performs an LTM cell switch to the selected cell based on an LTM configuration included in the first RRC reconfiguration message. In at least one example embodiment, the apparatus performs an LTM cell switch to the selected cell based on the LTM configuration in circumstance where the LTM configuration comprises an attempt LTM switch field. In at least one example embodiment, the apparatus determines that the LTM configuration comprises the attempt LTM switch field. In such an example, the apparatus performs the LTM cell switch based on the determination that the LTM configuration comprises the attempt LTM switch field. In at least one example embodiment, the apparatus determines that the selected cell is associated with the LTM configuration, and the performing of the LTM cell switch is based on the determination that the selected cell is associated with the LTM configuration. In at least one example embodiment, determining that the selected cell is associated with the LTM configuration comprises determining that the selected cell is an LTM candidate cell corresponding to an LTM candidate field included in the LTM configuration.

In at least one example embodiment, the apparatus performs a conditional reconfiguration to the selected cell based on a conditional reconfiguration included in the first RRC reconfiguration message. In at least one example embodiment, performing the conditional reconfiguration comprises applying a second RRC reconfiguration message that is included in the conditional reconfiguration included in the first RRC reconfiguration message. In at least one example embodiment, the apparatus applies the second RRC reconfiguration message to the selected cell based on the conditional reconfiguration in circumstance where the conditional reconfiguration comprises an attempt conditional reconfiguration field. In at least one example embodiment, the apparatus determines that the selected cell is associated with the conditional reconfiguration, and applying of the second RRC reconfiguration message to the selected cell is based on the determination that the selected cell is associated with the conditional configuration.

Figure 6:
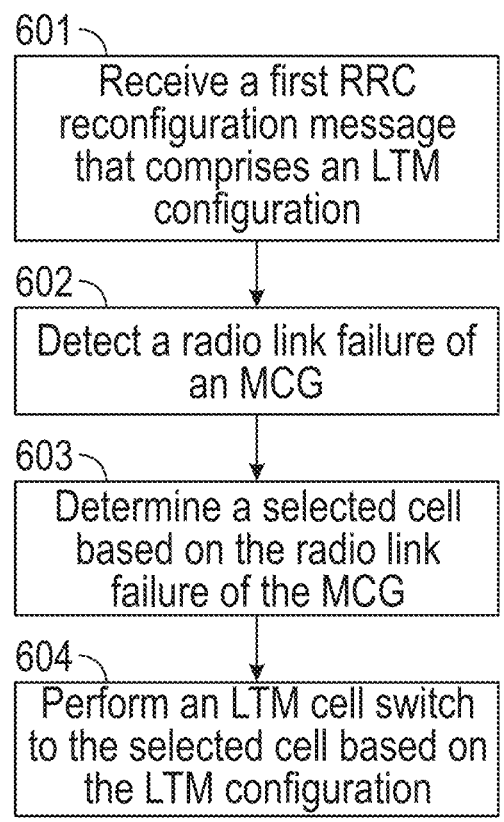
FIG. 6 is a flow diagram illustrating activities associated with transitioning to a selected cell according to at least one example embodiment.

FIG. 6 is a flow diagram illustrating activities associated with transitioning to a selected cell according to at least one example embodiment. In at least one example embodiment, there is a set of operations that corresponds with, at least some of, the activities of FIG. 6. For example, there may be a set of operations associated with activities of one or more apparatuses of FIG. 6. An apparatus, for example electronic apparatus 100 of FIG. 1, or a portion thereof, UE 201 of FIG. 2, or a portion thereof, or UE 204 of FIG. 2, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform set of operations of FIG. 6.

At block 601, the apparatus receives a first RRC reconfiguration message that comprises an LTM configuration. In at least one example embodiment, the first RRC reconfiguration message configures a master cell group (MCG).

At block 602, the apparatus detects a radio link failure of an MCG. In at least one example embodiment, the MCG is the MCG configured by the first RRC reconfiguration message.

At block 603, the apparatus determines a selected cell based on the radio link failure of the MCG. In at least one example embodiment, the apparatus determines a selected cell in response to the radio link failure of the MCG.

At block 604, the apparatus performs an LTM cell switch to the selected cell based on the LTM configuration. In at least one example embodiment, the apparatus performs an LTM cell switch to the selected cell based on the LTM configuration in circumstance where the LTM configuration comprises an attempt LTM switch field. In at least one example embodiment, the apparatus determines that the LTM configuration comprises the attempt LTM switch field. In such an example, the apparatus performs the LTM cell switch based on the determination that the LTM configuration comprises the attempt LTM switch field. In at least one example embodiment, the apparatus determines that the selected cell is associated with the LTM configuration, and the performing of the LTM cell switch is based on the determination that the selected cell is associated with the LTM configuration. In at least one example embodiment, determining that the selected cell is associated with the LTM configuration comprises determining that the selected cell is an LTM candidate cell corresponding to an LTM candidate field included in the LTM configuration.

Figure 7:
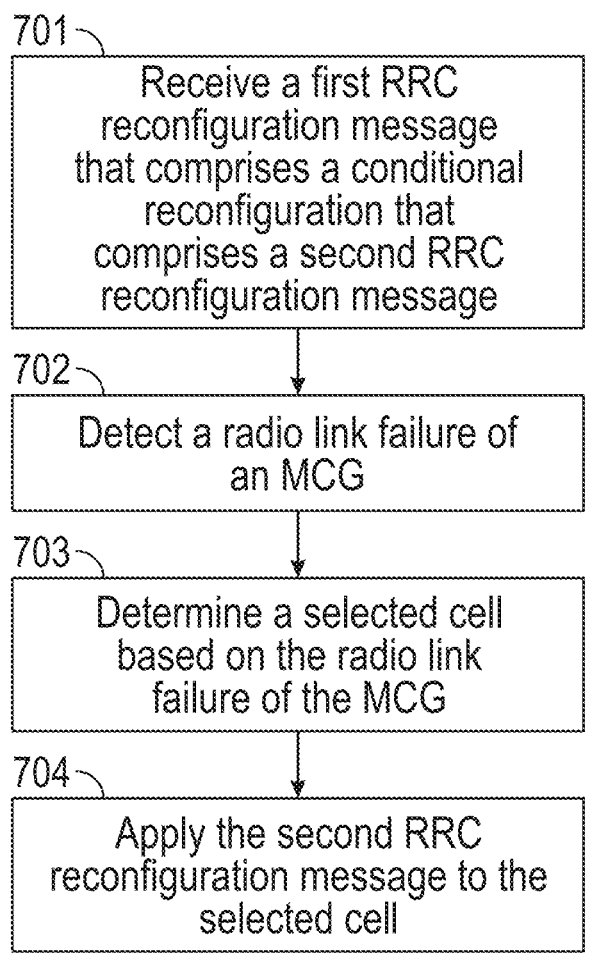
FIG. 7 is a flow diagram illustrating activities associated with transitioning to a selected cell according to at least one example embodiment.

FIG. 7 is a flow diagram illustrating activities associated with transitioning to a selected cell according to at least one example embodiment. In at least one example embodiment, there is a set of operations that corresponds with, at least some of, the activities of FIG. 7. For example, there may be a set of operations associated with activities of one or more apparatuses of FIG. 7. An apparatus, for example electronic apparatus 100 of FIG. 1, or a portion thereof, UE 201 of FIG. 2, or a portion thereof, or UE 204 of FIG. 2, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform set of operations of FIG. 7.

At block 701, the apparatus receives a first RRC reconfiguration message that comprises a conditional reconfiguration, which comprises a second RRC reconfiguration message. In at least one example embodiment, the first RRC reconfiguration message configures a master cell group (MCG).

At block 702, the apparatus detects a radio link failure of an MCG. In at least one example embodiment, the MCG is the MCG configured by the first RRC reconfiguration message.

At block 703, the apparatus determines a selected cell based on the radio link failure of the MCG. In at least one example embodiment, the apparatus determines a selected cell in response to the radio link failure of the MCG.

At block 704, the apparatus applies the second RRC reconfiguration message to the selected cell. In at least one example embodiment, the apparatus applies the second RRC reconfiguration message to the selected cell based on the conditional reconfiguration in circumstance where the conditional reconfiguration comprises an attempt conditional reconfiguration field. In at least one example embodiment, the apparatus determines that the selected cell is associated with the conditional reconfiguration, and applying of the second RRC reconfiguration message to the selected cell is based on the determination that the selected cell is associated with the conditional configuration.

Figure 8:
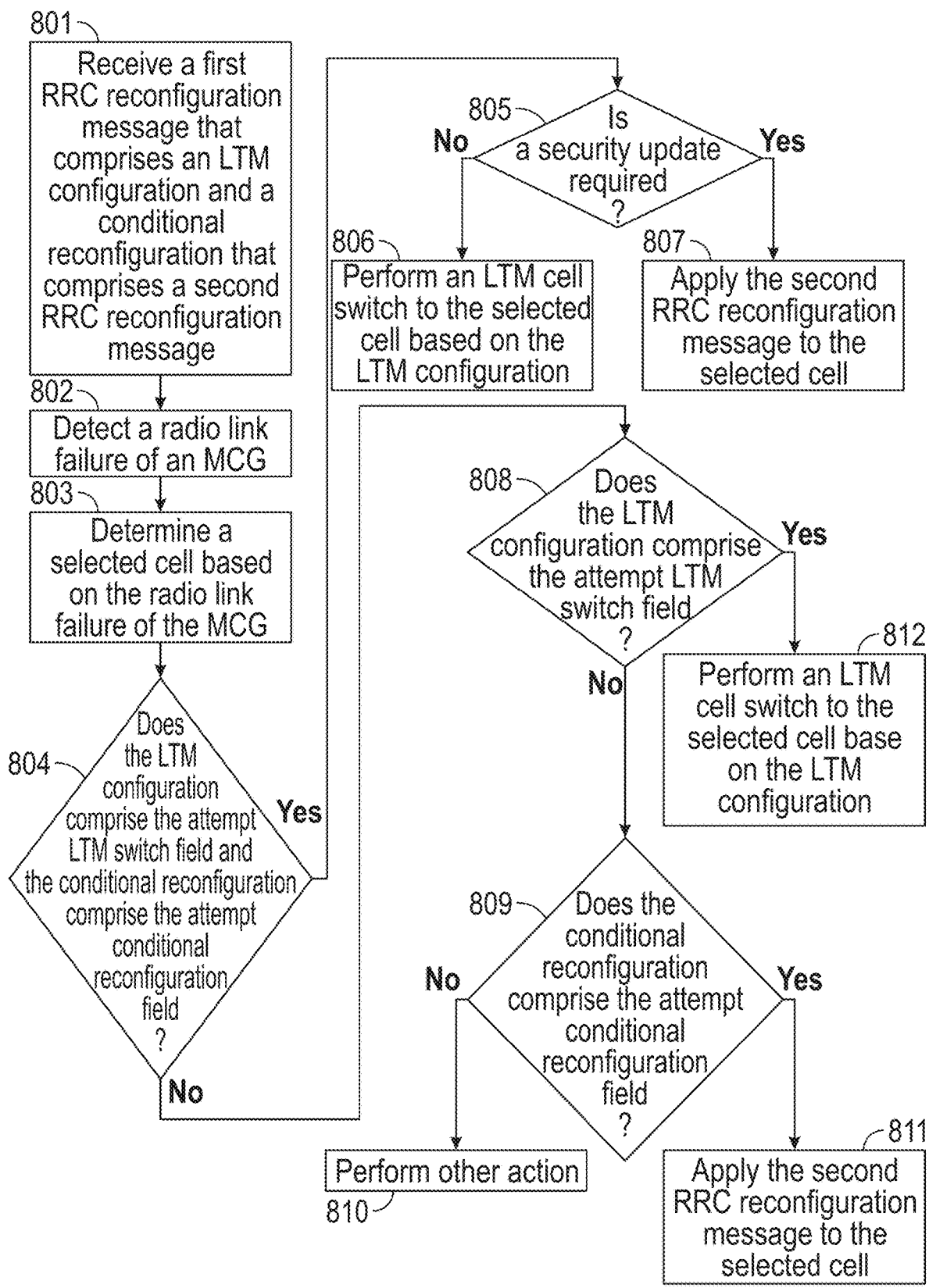
FIG. 8 is a flow diagram illustrating activities associated with transitioning to a selected cell according to at least one example embodiment.

FIG. 8 is a flow diagram illustrating activities associated with transitioning to a selected cell according to at least one example embodiment. In at least one example embodiment, there is a set of operations that corresponds with, at least some of, the activities of FIG. 8. For example, there may be a set of operations associated with activities of one or more apparatuses of FIG. 8. An apparatus, for example electronic apparatus 100 of FIG. 1, or a portion thereof, UE 201 of FIG. 2, or a portion thereof, or UE 204 of FIG. 2, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform set of operations of FIG. 8.

In some circumstances, the first RRC reconfiguration message can include both the attempt LTM switch field and the conditional reconfiguration field. In such circumstances, it may be desirable for the UE to determine whether to perform the LTM cell switch or the conditional reconfiguration, since the first RRC reconfiguration enables both options. In at least one example embodiment, the UE prioritizes the LTM cell switch over the conditional reconfiguration. In such circumstances, it may be desirable to reduce time and signaling overhead by performing the LTM cell switch.

However, in some circumstances it may be desirable to consider other factors. For example, it may be desirable to determine whether a security update is desired or required. In such circumstances, it may be desirable for the UE to perform the conditional reconfiguration, which can include a security update, instead of performing the LTM cell switch, which may be unable perform the security update.

At block 801, the apparatus receives a first RRC reconfiguration message that comprises an LTM configuration and a conditional reconfiguration that comprises a second RRC reconfiguration message. In at least one example embodiment, the first RRC reconfiguration message configures a master cell group (MCG).

At block 802, the apparatus detects a radio link failure of an MCG. In at least one example embodiment, the MCG is the MCG configured by the first RRC reconfiguration message.

At block 803, the apparatus determines a selected cell based on the radio link failure of the MCG. In at least one example embodiment, the apparatus determines a selected cell in response to the radio link failure of the MCG.

At block 804, the apparatus determines whether the LTM configuration comprises the attempt LTM switch field and the conditional reconfiguration comprises the attempt conditional reconfiguration field. In circumstances where both the LTM configuration comprises the attempt LTM switch field and the conditional reconfiguration comprises the attempt conditional reconfiguration field, flow proceeds to block 805. In circumstances where the LTM configuration does not comprise the attempt LTM switch field and/or the conditional reconfiguration does not comprise the attempt conditional reconfiguration field, flow proceeds to block 808.

At block 805, the apparatus determines whether or not a security update is required. In circumstances where the apparatus determines that a security update is not required, flow proceeds to block 806. In circumstances where the apparatus determines that a security update is required, flow proceeds to block 807.

At block 806, the apparatus performs an LTM cell switch to the selected cell based on the LTM configuration.

At block 807, the apparatus applies the second RRC reconfiguration message to the selected cell.

At block 808, the apparatus whether the LTM configuration comprises the attempt LTM switch field. In circumstance where the LTM configuration comprises the attempt LTM switch field, flow proceeds to block 812. In circumstance where the LTM configuration does not comprise the attempt LTM switch field, flow proceeds to block 809.

At block 809, the apparatus determines whether the conditional reconfiguration comprises the attempt conditional reconfiguration field. In circumstance where the conditional reconfiguration comprises the attempt conditional reconfiguration field, flow proceeds to block 811. In circumstances where the conditional reconfiguration does not comprise the attempt conditional reconfiguration field, flow proceeds to block 810.

At block 810, the apparatus performs other action regarding the selected cell.

At block 811, the apparatus applies the second RRC reconfiguration message to the selected cell.

At block 812, the apparatus performs an LTM cell switch to the selected cell based on the LTM configuration.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. A method performed by a user equipment (UE), the method comprising:
   receiving a first Radio Resource Control (RRC) reconfiguration message, the first RRC reconfiguration message including:
      a conditional reconfiguration field that comprises a conditional reconfiguration, and
      a lower-layer triggered mobility (LTM) configuration field that comprises an LTM configuration,
      the conditional reconfiguration comprising an RRC reconfiguration field that includes a second RRC reconfiguration message,
         wherein the second RRC reconfiguration message comprises a master key update field and a data radio bearer (DRB) configuration comprising a dual active protocol stack (DAPS) configuration field indicating that a DRB configured by the DRB configuration is a DAPS bearer, and
         wherein the LTM configuration field is precluded from the second RRC reconfiguration message,
      the LTM configuration comprising an attempt LTM switch field and an RRC reconfiguration field that includes a third RRC reconfiguration message, wherein:
         the conditional reconfiguration field, the LTM configuration field, and the master key update field are precluded from the third RRC reconfiguration message, and
         the DAPS configuration field is precluded from the third RRC reconfiguration message due to the third RRC reconfiguration message being included in the RRC reconfiguration field of the LTM configuration;
   detecting a radio link failure of a master cell group (MCG);
   determining a selected cell based on the radio link failure of the MCG; and
   performing an LTM cell switch to the selected cell based on the LTM configuration.

2. The method of claim 1, wherein the conditional reconfiguration comprises an attempt conditional reconfiguration field that instructs the UE to attempt to apply the second RRC reconfiguration message after radio link failure of the MCG.

3. The method of claim 2, further comprising determining that a security update is not required, wherein the performing of the LTM cell switch is based on the determination that the security update is not required.

4. The method of claim 1, further comprising determining that the LTM configuration comprises the attempt LTM switch field, wherein the performing of the LTM cell switch is based on the determination that the LTM configuration comprises the attempt LTM switch field.

5. The method of claim 1, wherein the conditional reconfiguration field and the LTM configuration field are precluded from the third RRC reconfiguration message due to the third RRC reconfiguration message being included in the RRC reconfiguration field of the LTM configuration.

6. The method of claim 1, wherein the LTM configuration field is precluded from the second RRC reconfiguration message due to the second RRC reconfiguration message being included in the RRC reconfiguration field of the conditional reconfiguration.

7. A user equipment (UE), comprising
   at least one processor; and
   at least one memory, the memory comprising machine-readable instructions, that when executed cause the UE to:
      receive a first Radio Resource Control (RRC) reconfiguration message, the first RRC reconfiguration message including:
         a conditional reconfiguration field that comprises a conditional reconfiguration, and
         a lower-layer triggered mobility (LTM) configuration field that comprises an LTM configuration,
         the conditional reconfiguration comprising an RRC reconfiguration field that includes a second RRC reconfiguration message,
            wherein the second RRC reconfiguration message comprises a master key update field and a data radio bearer (DRB) configuration comprising a dual active protocol stack (DAPS) configuration field indicating that a DRB configured by the DRB configuration is a DAPS bearer, and
            wherein the LTM configuration field is precluded from the second RRC reconfiguration message,
         the LTM configuration comprising an attempt LTM switch field and an RRC reconfiguration field that includes a third RRC reconfiguration message, wherein:
            the conditional reconfiguration field, the LTM configuration field, and the master key update field are precluded from the third RRC reconfiguration message, and
            the DAPS configuration field is precluded from the third RRC reconfiguration message due to the third RRC reconfiguration message being included in the RRC reconfiguration field of the LTM configuration;
      detect a radio link failure of a master cell group (MCG);
      determine a selected cell based on the radio link failure of the MCG; and
      perform an LTM cell switch to the selected cell based on the LTM configuration.

8. The UE of claim 7, wherein the conditional reconfiguration comprises an attempt conditional reconfiguration field that instructs the UE to attempt to apply the second RRC reconfiguration message after radio link failure of the MCG.

9. The UE of claim 8, wherein the memory further comprising machine-readable instructions, that when executed cause the UE to determine that a security update is not required, wherein the performing of the LTM cell switch is based on the determination that the security update is not required.

10. The UE of claim 7, wherein the memory further comprising machine-readable instructions, that when executed cause the UE to determine that the LTM configuration comprises the attempt LTM switch field, wherein the performing of the LTM cell switch is based on the determination that the LTM configuration comprises the attempt LTM switch field.

11. The UE of claim 7, wherein the conditional reconfiguration field and the LTM configuration field are precluded from the third RRC reconfiguration message due to the third RRC reconfiguration message being included in the RRC reconfiguration field of the LTM configuration.

12. The UE of claim 7, wherein the LTM configuration field is precluded from the second RRC reconfiguration message due to the second RRC reconfiguration message being included in the RRC reconfiguration field of the conditional reconfiguration.

13. At least one non-transitory computer readable medium comprising instructions that, when executed, perform:
  receiving a first Radio Resource Control (RRC) reconfiguration message, the first RRC reconfiguration message including:
    a conditional reconfiguration field that comprises a conditional reconfiguration, and
    a lower-layer triggered mobility (LTM) configuration field that comprises an LTM configuration,
    the conditional reconfiguration comprising an RRC reconfiguration field that includes a second RRC reconfiguration message,
      wherein the second RRC reconfiguration message comprises a master key update field and a data radio bearer (DRB) configuration comprising a dual active protocol stack (DAPS) configuration field indicating that a DRB configured by the DRB configuration is a DAPS bearer, and
      wherein the LTM configuration field is precluded from the second RRC reconfiguration message,
    the LTM configuration comprising an attempt LTM switch field and an RRC reconfiguration field that includes a third RRC reconfiguration message, wherein:
      the conditional reconfiguration field, the LTM configuration field, and the master key update field are precluded from the third RRC reconfiguration message, and
      the DAPS configuration field is precluded from the third RRC reconfiguration message due to the third RRC reconfiguration message being included in the RRC reconfiguration field of the LTM configuration;
  detecting a radio link failure of a master cell group (MCG);
  determining a selected cell based on the radio link failure of the MCG; and
  performing an LTM cell switch to the selected cell based on the LTM configuration.

14. The medium of claim 13, wherein the conditional reconfiguration comprises an attempt conditional reconfiguration field that instructs a user equipment (UE) to attempt to apply the second RRC reconfiguration message after radio link failure of the MCG.

15. The medium of claim 14, further comprising determining that a security update is not required, wherein the performing of the LTM cell switch is based on the determination that the security update is not required.

16. The medium of claim 13, further comprising determining that the LTM configuration comprises the attempt LTM switch field, wherein the performing of the LTM cell switch is based on the determination that the LTM configuration comprises the attempt LTM switch field.

17. The medium of claim 13, wherein the conditional reconfiguration field and the LTM configuration field are precluded from the third RRC reconfiguration message due to the third RRC reconfiguration message being included in the RRC reconfiguration field of the LTM configuration.

18. The medium of claim 13, wherein the LTM configuration field is precluded from the second RRC reconfiguration message due to the second RRC reconfiguration message being included in the RRC reconfiguration field of the conditional reconfiguration.

* * * * *